Feb. 17, 1970   J. H. ANDRESEN, JR   3,496,534
MAXIMUM ALLOWABLE AIRSPEED INDICATING MEANS
Filed Jan. 17, 1966   2 Sheets-Sheet 1 though the relatively complicated mechanical linkages involved not only tend to make the device less reliable, but limit, because of design considerations, the number of discontinuous parts of the above mentioned function which may be utilized.

United States Patent Office 3,496,534
Patented Feb. 17, 1970

3,496,534
MAXIMUM ALLOWABLE AIRSPEED INDICATING MEANS
John H. Andresen, Jr., Hewitt, N.J., assignor to Intercontinental Dynamics Corporation, Englewood, N.J.
Filed Jan. 17, 1966, Ser. No. 521,024
Int. Cl. G08g 5/00; G01c 21/00
U.S. Cl. 340—27       3 Claims This invention relates generally to the field of aircraft instrumentation, and more particularly to an improved means for indicating maximum allowable airspeed.

In U.S. Patent No. 3,132,323, granted May 5, 1964 to Frederic Hauptman, there is disclosed a device capable of providing an audible or visual signal to the pilot of an aircraft during those periods in which maximum allowable airspeed for any given altitude is exceeded. The maximum allowable airspeed at any particular altitude will, of course, vary depending upon the type and design of the aircraft concerned, but will normally be a discontinuous function at the altitude between the operational limits concerned.

Prior art devices, as exemplified by the above mentioned Hauptman patent, while not without utility, have suffered from disadvantages in that the relatively complicated mechanical linkages involved not only tend to make the device less reliable, but limit, because of design considerations, the number of discontinuous parts of the above mentioned function which may be utilized.

It is therefore among the principal objects of the present invention to provide an improved maximum allowable airspeed indicating means of the class described in which the above mentioned disadvantages have been substantially eliminated.

Another object of the invention lies in the provision of an improved maximum allowable airspeed indicating means providing a greater useful flight envelope, and having more flexibility of adjustment to changed flight operating limits, as contrasted with prior art devices.

A further object of the invention lies in the provision of an improved maximum allowable airspeed indicating means in which the bulk of the mechanical linkages of prior art devices have been replaced by electrical components.

A feature of the disclosed embodiment lies in the fact that accuracy of operation is independent of voltage fluctuations of a single power source.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
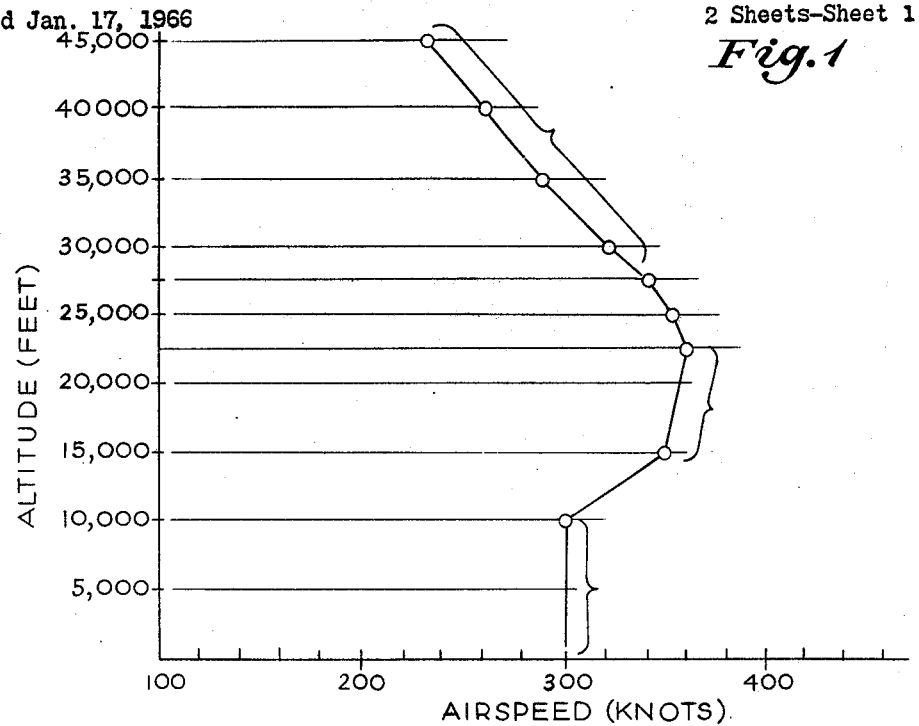
FIGURE 1 is a graph showing maximum allowable airspeed at varying altitudes as a typical discontinuous function of altitude.

Before entering into a detailed consideration of the disclosed embodiment, a brief discussion of the graph shown in FIGURE 1 is desirable.

From ground level to approximately 10,000 feet, maximum allowable airspeed for a typical aircraft will remain approximately constant at 300 knots. From approximately 10,000 feet to 15,000 feet, a gradual increase in maximum allowable airspeed is present. This gradual increase continues, but at a slower rate up to a point between 20,000 and 25,000 feet, at which point other factors outweigh the continuous thinning of the air medium with increased altitude, and as the aircraft enters continuously higher operating altitudes, maximum allowable airspeed is continuously reduced up to the operational ceiling. As seen in FIGURE 1, the discontinuous function may be best represented by a series of interconnected straight lines, and the more reference points that are available for the plotting of these lines, the more accurately it is possible to approximate the discontinuous function.

Figure 2:
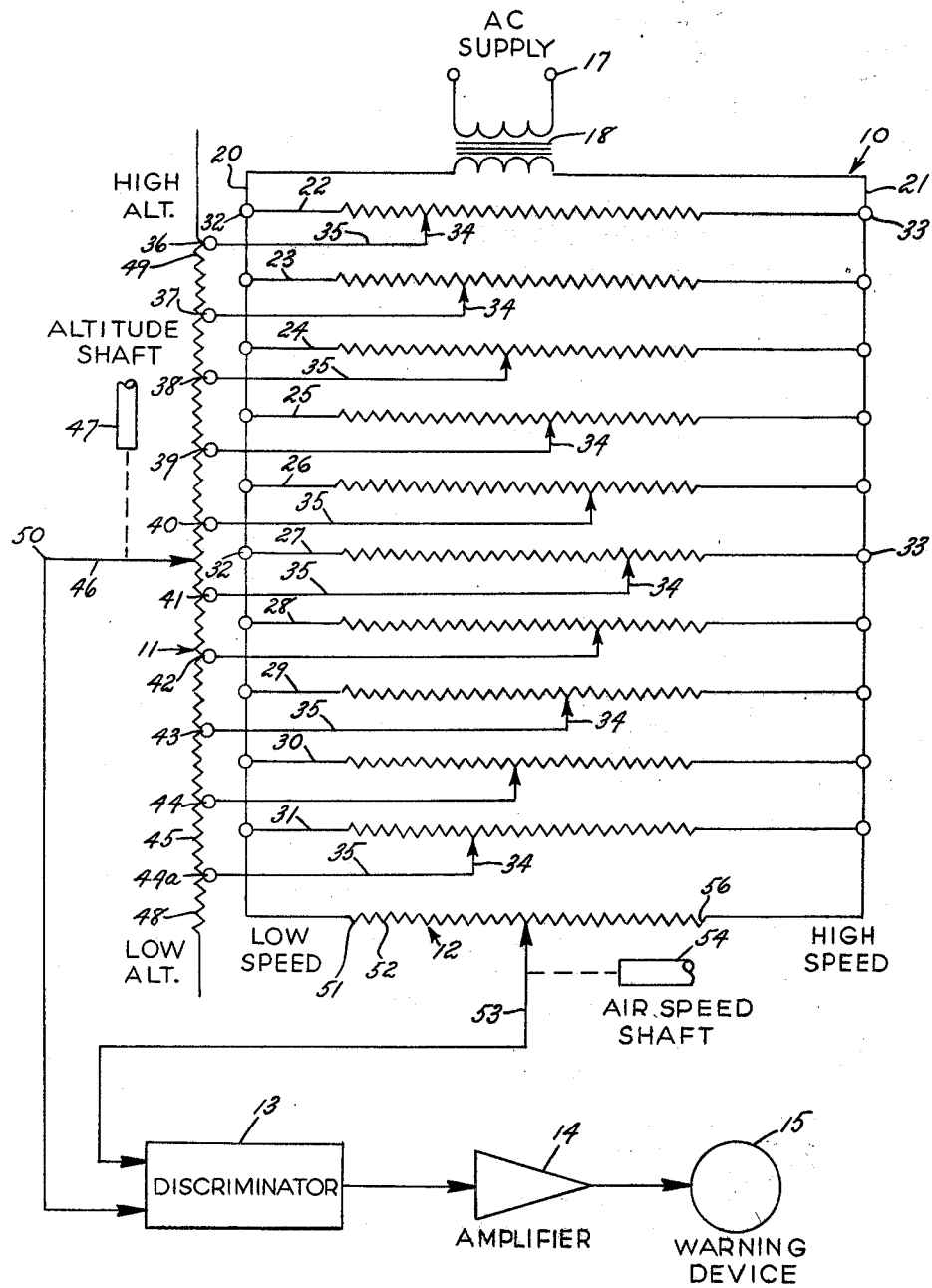
FIGURE 2 is a schematic diagram showing an embodiment of the invention.

With the foregoing in mind, reference may now be made to FIGURE 2 in the drawings, wherein there is schematically illustrated an embodiment of the invention. The device, generally indicated by reference character 10, comprises broadly: first and second potentiometer elements 11 and 12, repsectively, a discriminator element 13, an amplifier element 14, and warning means 15.

The first potentiometer element 11, as is the second potentiometer element 12, is supplied through a transformer by an AC voltage source, preferably the 400 cycle per second voltage generated by most larger aircraft for operating electrical devices. The source 17 is fed to a transformer 18, the secondary winding of which is connected to a pair of conductors 20 and 21. Connected in parallel between the conductors 20 and 21 are the resistance windings of a plurality of potentiometers 22, 23, 24, 25, 26, 27, 28, 29, 30 and 31 at first and second terminals 32 and 33, respectively. Each of the potentiometers 22–31 is provided with a manually adjustable wiper 34, the base 35 of which is connected to one of a plurality of taps 36, 37, 38, 39, 40, 41, 42, 43, 44 and 44a along the resistance winding 45 of the potentiometer element 11. The wiper 46 of the potentiometer 45 is driven by a shaft 47, the rotation of which is responsive to the instantaneously attained altitude of the aircraft, to result in the shifting of the wiper 46 between a point 48 corresponding to low altitude, and a point 49 corresponding to high altitude. The base 50 of the wiper 46 is connected directly to the discriminator element 13. Prior to commencement of operation, the individual wipers 34 are manually adjusted to correspond to points plotted on the graph of FIGURE 1 in terms of electrical resistance.

The second potentiometer element 12 includes a resistance winding 52 connected between the conductors 20 and 21 to be powered by the voltage source 17. A wiper 53 contacting the winding 52 is driven by a shaft 54, the rotation of which is related to the instantaneous airspeed of the aircraft to result in movement of the wiper between a low speed point 51 and a high speed point 56. The base of the wiper 55 is also connected to the discriminator element 13.

Figure 3:
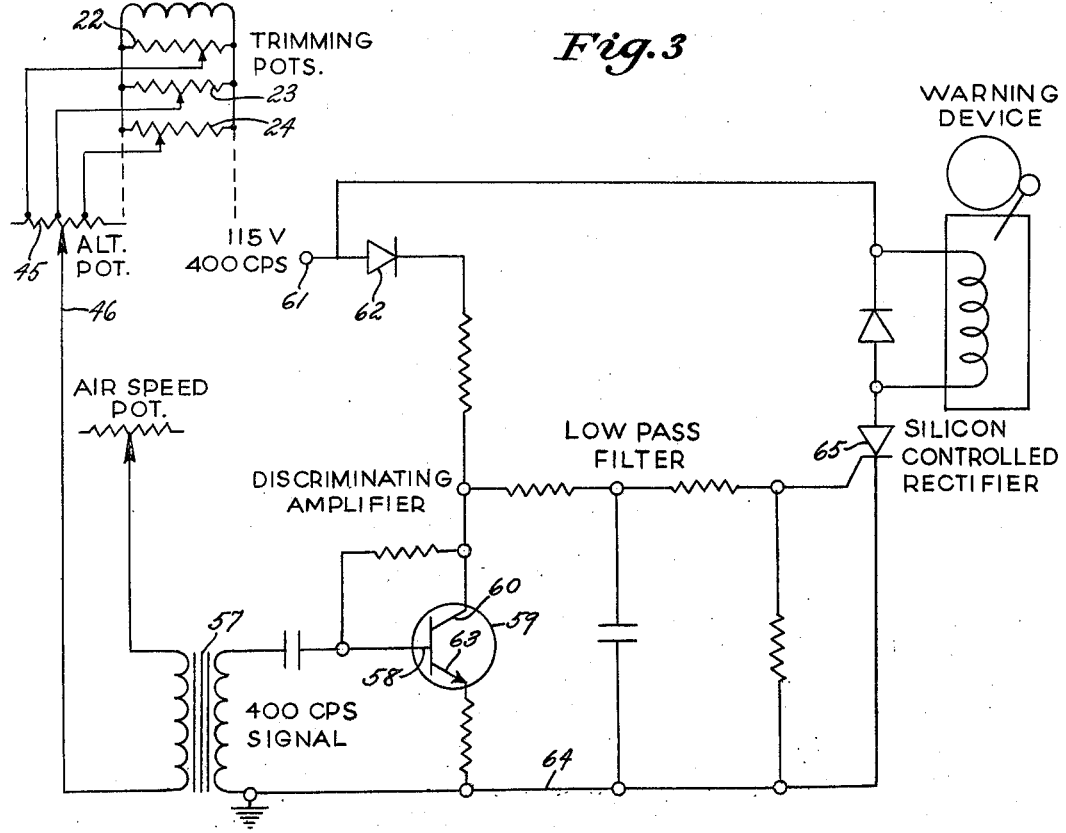
FIGURE 3 is a schematic wiring diagram showing in greater detail certain of the elements illustrated in FIGURE 2.

Referring to FIGURE 3 in the drawing, there is illustrated a typical combined discriminator element 13 and amplifier element 14, although, it will be understood by those skilled in the art, other discriminators and amplifiers, well known in the art, may be substituted, if desired. Voltages from the first and second potentiometer elements 11 and 12 are fed to the opposed ends of the primary winding of a coupling transformer 57, the output of the transformer being connected to the base 58 of a transistor 59. The collector 60 thereof is powered by the same above mentioned 115 volt source from a terminal at 61 through a diode 62. The output of the emitter 63 flows through a conductor 64 to a silicon controlled rectifier 65 which in turn permits the flow of current through the warning means 15 which may be either of audible or visual type.

A warning signal will occur when the voltage generated by the speed responsive potentiometer exceeds that from the altitude responsive potentiometer. Since both are energized from the same voltage source, the supply voltage does not affect the warning point. The warning point at any given altitude is determined by the phase reversal of the voltage between the potentiometer sliders.

It will be readily understood by those skilled in the art that depending upon the accuracy required, as many parallel connected potentiometers 22–31 may be provided as required. Each additional potentiometer will provide an additional point on the graph shown in FIGURE 1, with the result that continuously closer approximation of the discontinuous function will be obtained.

I wish it to be understood that I do not consider the invention limited to the precise details of structure shown and set forth in this specification, for obvious modifications will occur to those skilled in the art to which the invention pertains.

I claim:

1. Improved maximum permissible airspeed indicating means comprising: first shaft means rotationally responsive to instantaneous altitude of an aircraft, second shaft means rotationally responsive to instantaneous airspeed of said aircraft, a first potentiometer element including a first plurality of parallel connected potentiometers, each of said last mentioned potentiometers having an individually adjustable wiper; said first potentiometer element including a second potentiometer having a resistance winding and a wiper driven by said first shaft means, each of said individually adjustable wipers being connected to individual taps along said last mentioned resistance winding; a second potentiometer element including a resistance winding and a wiper driven by said second shaft means; discriminating means, each of said first and second potentiometer elements being connected to said discriminating means, and warning means connected to the output of said discriminating means.

2. Structure in accordance with claim 1 in which said first and second potentiometer elements are powered by a common voltage source.

3. Structure in accordance with claim 1 in which said first and second potentiometer elements, said discriminating amplifying means, and said warning means are powered from a common voltage source.

References Cited

UNITED STATES PATENTS

| | | | |
|---|---|---|---|
| 3,077,575 | 2/1963 | Beck et al. | 340—27 |
| 3,132,323 | 5/1964 | Hauptman | 340—27 |
| 3,271,542 | 9/1966 | Hradek | 340—27 XR |
| 3,302,167 | 1/1967 | Andresen | 340—27 |

JOHN W. CALDWELL, Primary Examiner

A. H. WARING, Assistant Examiner

U.S. Cl. X.R.

73—178